(12) United States Patent
Padilla

(10) Patent No.: US 12,044,386 B2
(45) Date of Patent: Jul. 23, 2024

(54) RETRO RECESSED ELECTRICAL WALL BOX

(71) Applicant: Nelson G. Padilla, Fort Myers, FL (US)

(72) Inventor: Nelson G. Padilla, Fort Myers, FL (US)

(*) Notice: Subject to any disclaimer, the term of this patent is extended or adjusted under 35 U.S.C. 154(b) by 0 days.

(21) Appl. No.: 17/977,517

(22) Filed: Oct. 31, 2022

(65) Prior Publication Data

US 2023/0392772 A1  Dec. 7, 2023

Related U.S. Application Data

(60) Provisional application No. 63/275,478, filed on Nov. 4, 2021.

(51) Int. Cl.

| | | |
|---|---|---|
| *F21V 21/04* | (2006.01) | |
| *E04B 9/00* | (2006.01) | |
| *F21S 8/00* | (2006.01) | |
| *F21V 23/00* | (2015.01) | |
| *F21V 23/02* | (2006.01) | |
| *H02G 3/08* | (2006.01) | |
| *H02G 3/10* | (2006.01) | |
| *H02G 3/12* | (2006.01) | |

(52) U.S. Cl.
CPC ............ *F21V 21/047* (2013.01); *F21S 8/036* (2013.01); *E04B 9/006* (2013.01); *F21V 23/007* (2013.01); *F21V 23/008* (2013.01); *F21V 23/009* (2013.01); *F21V 23/023* (2013.01); *F21V 23/026* (2013.01); *H02G 3/08* (2013.01); *H02G 3/081* (2013.01); *H02G 3/086* (2013.01); *H02G 3/10* (2013.01); *H02G 3/105* (2013.01); *H02G 3/12* (2013.01); *H02G 3/121* (2013.01); *H02G 3/123* (2013.01); *H02G 3/125* (2013.01); *H02G 3/126* (2013.01); *H02G 3/128* (2013.01); *Y10S 248/906* (2013.01)

(58) Field of Classification Search
CPC ............ H02G 3/08–126; F21V 23/007; F21V 23/008; F21V 23/009; F21V 23/023; F21V 23/026; F21V 21/04; F21V 21/041; F21V 21/042; F21V 21/043; F21V 21/044; F21V 21/045; F21V 21/046; F21V 21/047; F21V 21/048; F21V 21/049; F21S 8/02; F21S 8/022; F21S 8/024; F21S 8/026; F21S 8/028; E04B 9/006; Y10S 248/906
See application file for complete search history.

(56) References Cited

U.S. PATENT DOCUMENTS

| | | | | |
|---|---|---|---|---|
| 3,633,782 | A * | 1/1972 | Bellinger | ............... H02G 3/123 220/3.5 |
| 5,942,726 | A * | 8/1999 | Reiker | .................... E04B 9/006 220/3.9 |
| 6,765,149 | B1 | 7/2004 | Ku | |
| 7,967,481 | B2 | 6/2011 | Seo | |

(Continued)

FOREIGN PATENT DOCUMENTS

CA   2951300   7/2019

*Primary Examiner* — Colin J Cattanach
(74) *Attorney, Agent, or Firm* — Bryan L. Loeffler, Esq.; LOEFFLER IP GROUP, P.A.

(57) ABSTRACT

An electrical light fixture wall box (5) having a open top (6) for mounting a light fixture and a bottom (7) with attached leg section (16) having a plurality of legs (8) with teeth (9) for insertion into a wall cutout with screws (10) to adjust and level the wall box in a fully recessed position in a wall.

1 Claim, 6 Drawing Sheets

(56) References Cited

U.S. PATENT DOCUMENTS

| | | |
|---|---|---|
| 8,480,268 B2 | 7/2013 | Wilson et al. |
| 8,506,134 B2 | 8/2013 | Wilson et al. |
| 8,820,985 B1 | 9/2014 | Tam et al. |
| 9,151,457 B2 | 10/2015 | Pickard et al. |
| 9,478,958 B2 | 10/2016 | Solan |
| 9,673,597 B2 * | 6/2017 | Lee .................. H02G 3/123 |
| 10,106,088 B2 | 10/2018 | Smith |
| 10,408,396 B2 | 9/2019 | Wronski et al. |
| 10,916,880 B2 | 2/2021 | Pyrrhus |
| 2006/0021778 A1 * | 2/2006 | Fields ................ H02G 3/123 |
| | | 174/58 |
| 2008/0149360 A1 * | 6/2008 | Dinh ................ H02G 3/123 |
| | | 30/360 |
| 2017/0307198 A1 | 10/2017 | Shah et al. |

\* cited by examiner

RETRO RECESSED ELECTRICAL WALL BOX

CROSS REFERENCE TO RELATED APPLICATIONS

This application claims the priority benefit of Provisional Patent Application No. 63/275,478 filed on Nov. 4, 2021.

BACKGROUND OF THE INVENTION

This invention relates electrical light mounting devices and more particularly to an electrical wall light box that is recessed and hidden from view when installed.

Conventional electrical wall light boxes, also known as Reno electrical boxes, are mounted in walls, usually made of drywall, in a hole cut into the drywall. In order to support and level the box, such conventional boxes have a rim that extends around the perimeter of the box. Unfortunately, the latter perimeter rim prevents the box from being recessed fully into the wall and results in an appearance that is not esthetic and not desirable.

Thus, a need exists for an electrical wall light box with a different leveling and supporting mechanism that enables the box to be mounted in a wall in a fully recessed fashion.

The prior art includes the following patent references, but none has the structure like the present invention:

| Patent/App. No. | Inventor | Date |
| --- | --- | --- |
| 6,765,149 | Ku | Jul. 20, 2004 |
| 7,967,481 | Seo | Jun. 28, 2011 |
| 8,480,268 | Wilson et al. | Jul. 9, 2013 |
| 8,506,134 | Wilson et al. | Aug. 13, 2013 |
| 8,820,985 | Tam et al. | Sep. 2, 2014 |
| CA 2,951,300 | Stauner et al. | Jul. 16, 2019 |
| 9,151,457 | Pickard et al. | Oct. 6, 2015 |
| 10,106,088 | Smith | Oct. 23, 2018 |
| 9,478,958 | Solan | Oct. 25, 2016 |
| 9,673,597 | Lee | Jun. 6, 2017 |
| 10,408,396 | Wronskie et al. | Sep. 10, 2019 |
| 10,916,880 | Pyrrhus | Feb. 9, 2021 |
| 2017/0307198 | Shah et al. | Oct. 26, 2017 |

SUMMARY OF THE INVENTION

The primary object of the present invention is to provide an electrical wall box that enables a light fixture to be fully recessed into a wall surface.

Another object of the present invention is to provide such an electrical wall box that is securely mounted in a level fashion within a wall.

The present invention fulfills the above and other objects by providing an electrical light fixture box for installation in an aperture within an outer wall that has a leg section having a plurality of legs with teeth attached to a bottom by threaded drywall anchor location leveling screws inserted from inside the bottom of the box through apertures. The fixture box is leveled and secured by adjustably rotating the screws so that the legs with teeth push against a wall until level the electrical light fixture box is fully recessed and level within a wall.

The above and other objects, features and advantages of the present invention should become even more readily apparent to those skilled in the art upon a reading of the following detailed description in conjunction with the drawings wherein there is shown and described illustrative embodiments of the invention.

DESCRIPTION OF THE DRAWINGS

In the following detailed description, reference will be made to the attached drawings in which.

DESCRIPTION OF THE PREFERRED EMBODIMENTS

Figure 1:
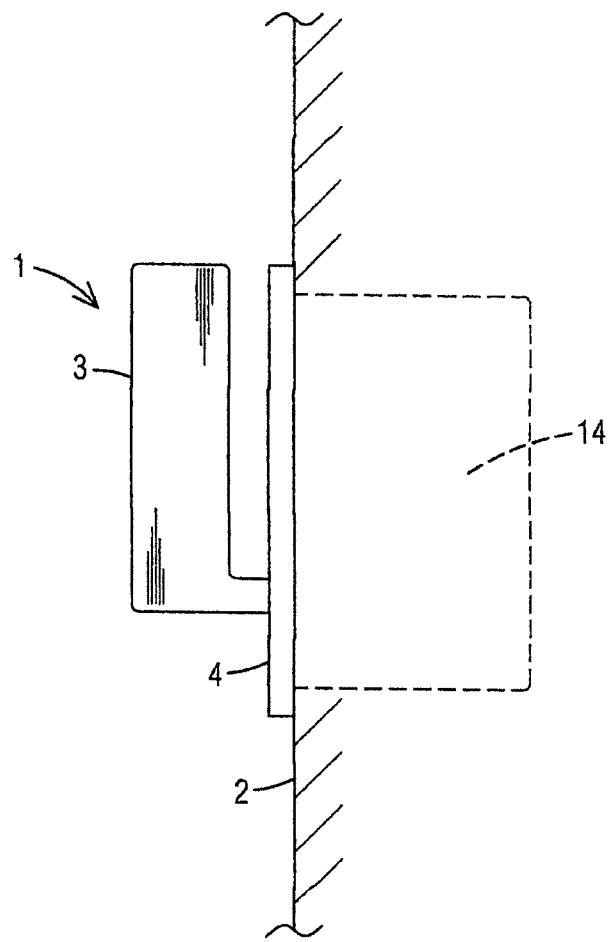
FIG. 1 is a side partial plan view of an electrical light fixture using an electrical light box of the prior art.

For purposes of describing the preferred embodiment, the terminology used in reference to the numbered items in the drawings is as follows:

1. electrical light fixture (prior art)
2. wall
3. light fixture
4. rim
5. electrical light box, generally (present invention)
6. top of box
7. bottom of box
8. legs of box
9. tooth on legs
10. drywall anchor location leveling screws
11. light fixture mounting holes
12. wire knockouts
13. leg section attachment screw
14. drywall cutout
15. leveling screw apertures
16. anchoring leg section
17. leg section screw aperture
18. planar top of leg section
19. side anchor Referring now to the drawing figures, FIG. 1 illustrates an electrical light box fixture of the prior art showing a light fixture 3 mounted in a wall 2 leaving an unesthetic exposed rim 4, typical of conventional electrical wall boxes.

Figure 2:
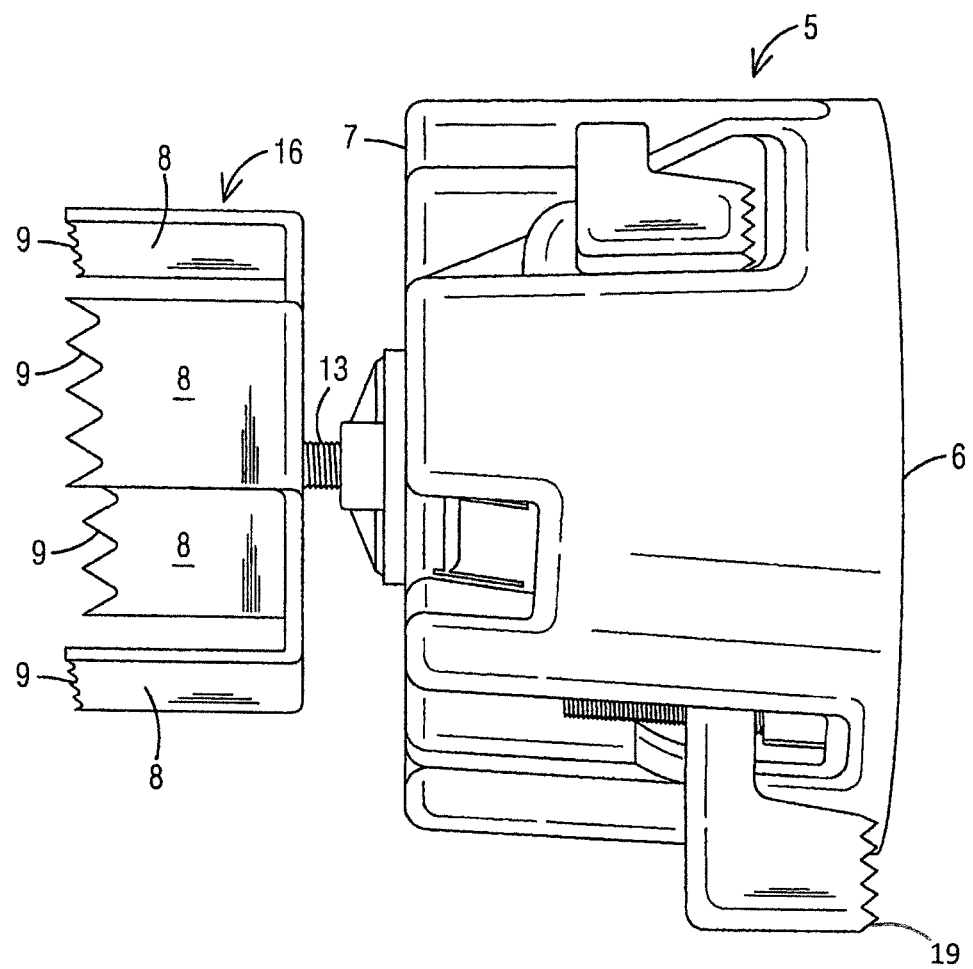
FIG. 2 is a side view of an electrical light box of the present invention.
Figure 3:
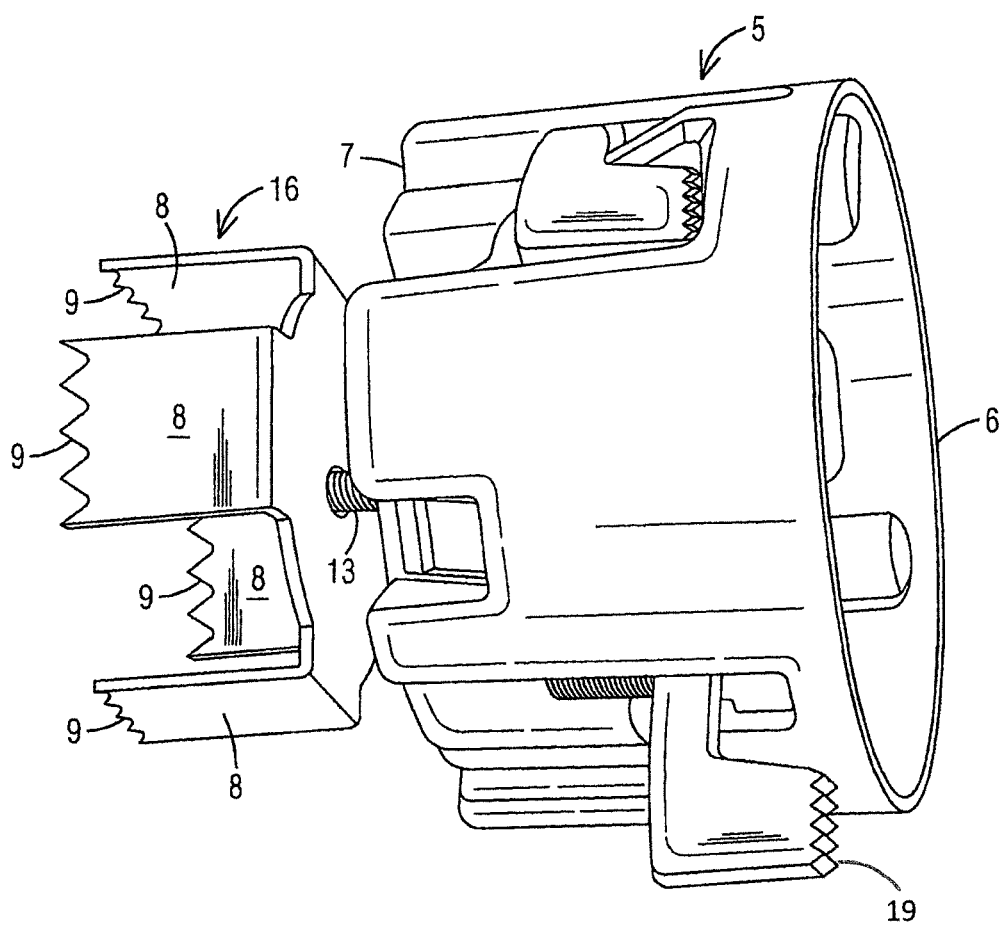
FIG. 3 is a side perspective view of an electrical light box of the present invention.

FIG. 2 illustrates a side view of an electrical light fixture box 5, generally, of the present invention having a top 6 and bottom 7 with an attached leg section 16 having a plurality of leveling support legs 8 extending from the bottom 7. Each leg 8 preferably has a series of teeth 9 to better secure it within the wall against an inner wall and to keep it from rotating. A plurality of side anchors 19 extend from a side wall adjacent to the open top 6 wherein said plurality of side anchors 19 are capable of being positioned against an outer wall during installation and forced against said outer wall as the distance between the anchoring leg section 16 and the bottom 7 of the fixture box 5 is increased, thereby causing the fixture box 5 to sandwich itself between the inner wall and the outer wall FIG. 3 illustrates a side perspective view of the electrical light fixture box 5 having an open top 6 and bottom 7 with the leg section 16 having a plurality of legs 8 with teeth.

Figure 4:
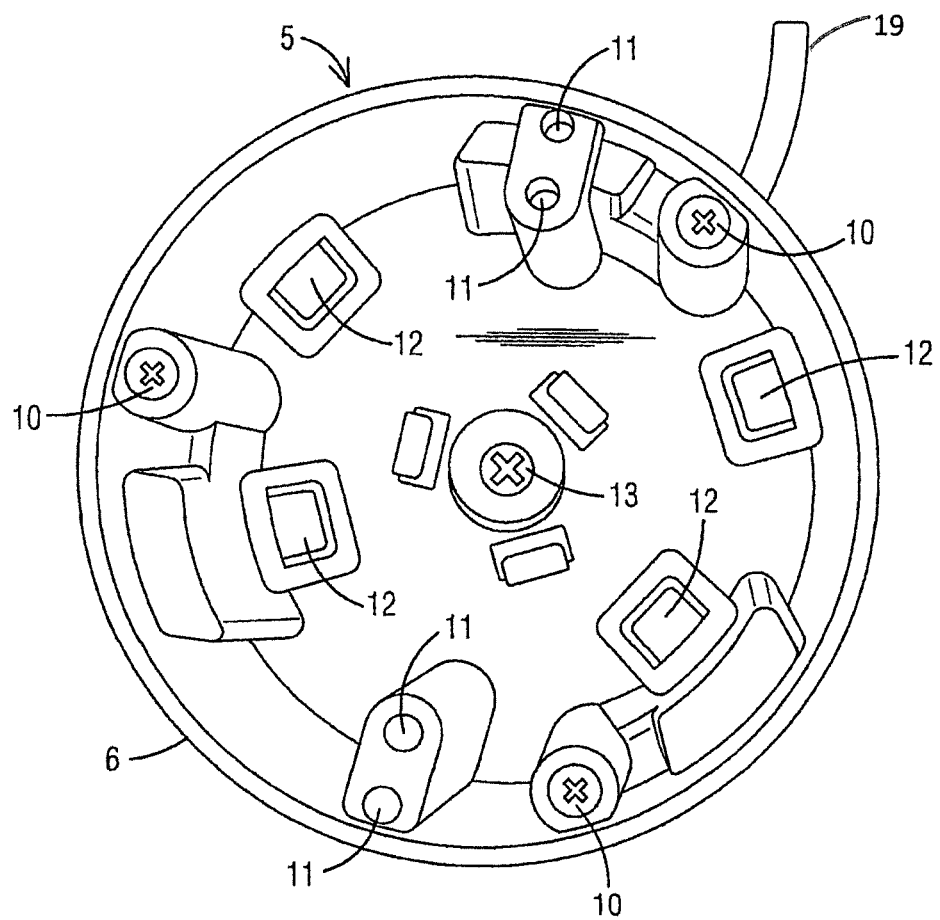
FIG. 4 is a top view of the electrical light box of the present invention.

FIG. 4 illustrates a top view of the electrical light fixture box 5 showing light fixture mounting holes 11, wire knockouts 12, a centrally-located leg section attachment screw 13 and drywall anchor location leveling screws 10 around a perimeter thereof.

Figure 5:
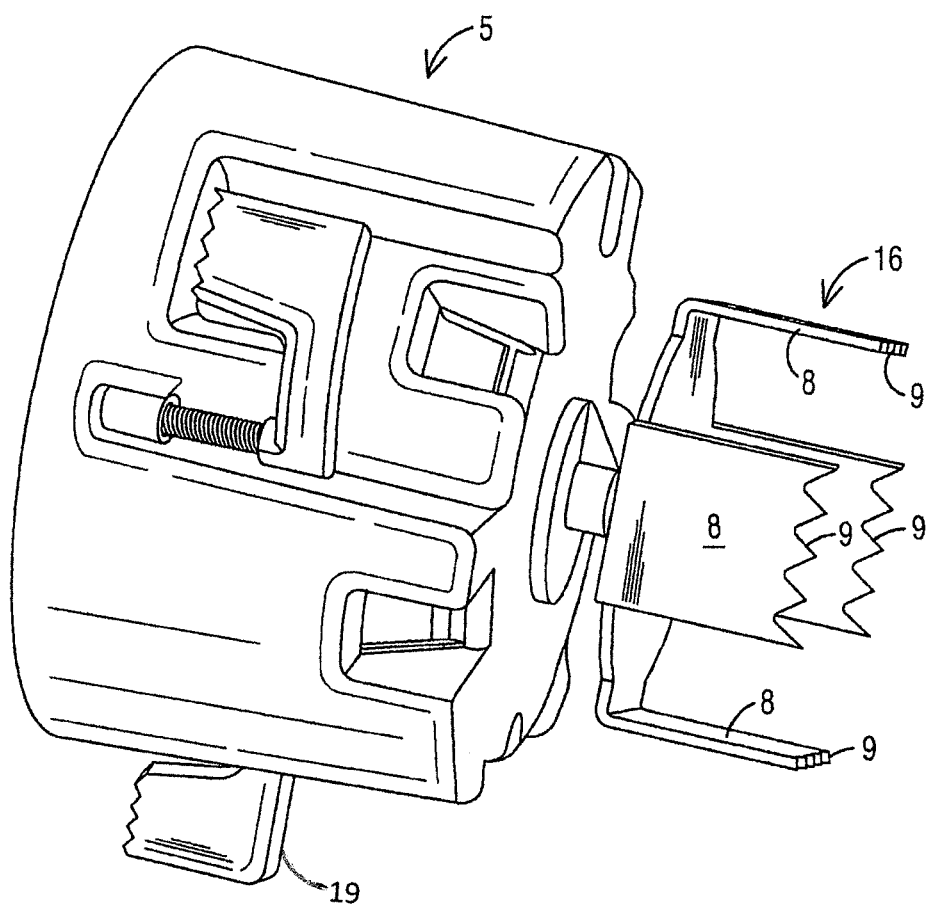
FIG. 5 is another side perspective view of the electrical light box of the present invention.

FIG. 5 illustrates in side perspective view an electrical light fixture box 5 in prior to being mounted in a wall cutout (not shown). First the leg section 16 having the legs 8 with teeth 9 are inserted into the wall cutout until the legs 8 abut against the inner wall at which time the box is leveled by adjusting the drywall anchor location leveling screws 10 from the open top 6 (shown in previous drawings figures) of the box 5.

Figure 6:
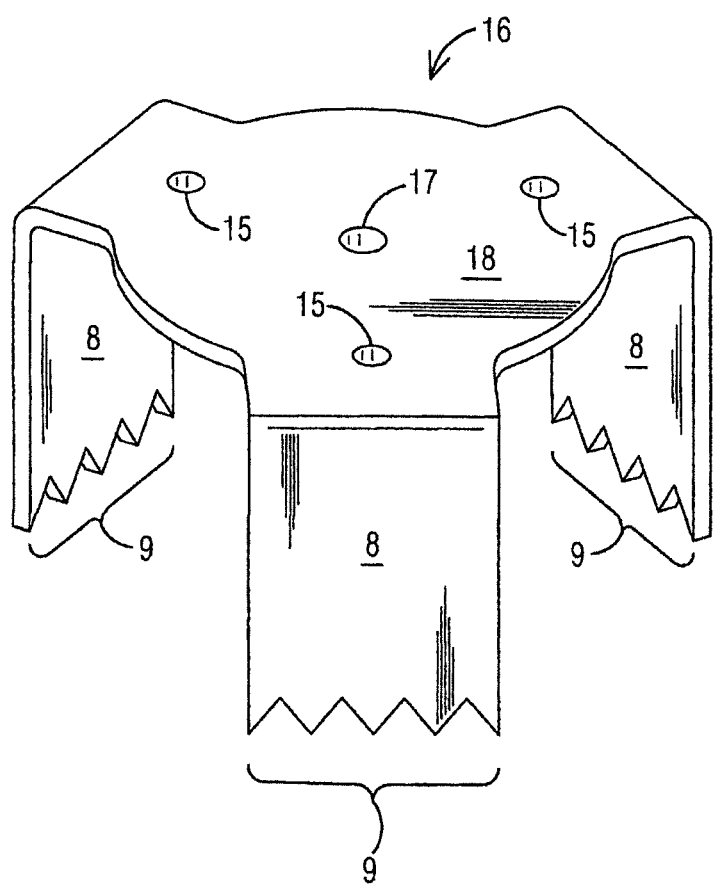
FIG. 6 is a perspective view of the leg section of the electrical light box of the present invention by itself.

FIG. 6 illustrates a perspective view of the leg section 16, generally, of the electrical light fixture box of the present invention. The leg section 16 is attached to the bottom 7 of the electrical light fixture box 5 (not shown) by a screw 13 centrally-located in the open top 6 into a centrally-located aperture 17 of a planar top 18 of the leg section 16. The leg threaded drywall anchor location leveling screws (not shown here but depicted as 10 in other drawings) inserted from inside the bottom of the fixture box 7 (not shown) through apertures 15. The fixture box may be leveled and secured by adjustably rotating the screws 13 so that the legs 8 with teeth 9 push against the inner wall until level so that the electrical box 5 is fully recessed and level within the wall.

It is to be understood that while a preferred embodiment of the invention is described, it is not to be limited to the specific form or arrangement of parts herein described and shown. It will be apparent to those skilled in the art that various changes may be made without departing from the scope of the invention and the invention is not to be considered limited to what is shown and described in the specification and/or drawings.

Having thus described my invention I claim:

1. An electrical fixture box for installation in a hollow wall wherein said wall has an open cavity located between an inner-wall and an outer-wall in which an aperture is cut into the outer wall to allow for installation of said electrical fixture box, said electrical fixture box comprising:
   a closed bottom having at least one side wall that defines an interior space that is accessible through an open top;
   a leg section attachment screw centrally located on the closed bottom of the fixture box wherein a head of the leg section attachment screw is freely rotatable in relation to the closed bottom;
   said leg section attachment screw being accessible through the open top of the fixture box to allow the screw to be freely rotated in relation to the closed bottom;
   a leg section being attached to the closed bottom by the leg section attachment screw;
   said leg section being attached to the leg section attachment screw by a threaded connection;
   said leg section having at least one leg with teeth located thereon to allow the leg section to grip the inner wall and prevent the leg section from rotating while the leg section attachment screw is being rotated; and
   a plurality of folding side anchors extending from the at least one side wall wherein said plurality of folding side anchors are capable of pushing against the outer wall as the leg section pushes against the inner wall, thereby sandwiching the electrical fixture box within the hollow wall between the inner wall and outer wall.

* * * * *